United States Patent
Taylor et al.

(10) Patent No.: US 12,465,012 B2
(45) Date of Patent: Nov. 11, 2025

(54) PET CRATE INSERT

(71) Applicant: CHAGRINOVATIONS, LLC, Naples, FL (US)

(72) Inventors: Curtis Taylor, Chagrin Falls, OH (US); Matthew Hanson, Chagrin Falls, OH (US)

(73) Assignee: CHAGRINOVATIONS, LLC, Rocky River, OH (US)

( * ) Notice: Subject to any disclaimer, the term of this patent is extended or adjusted under 35 U.S.C. 154(b) by 1273 days.

(21) Appl. No.: 16/275,874

(22) Filed: Feb. 14, 2019

(65) Prior Publication Data

US 2019/0261594 A1    Aug. 29, 2019

Related U.S. Application Data

(60) Provisional application No. 62/635,811, filed on Feb. 27, 2018.

(51) Int. Cl.
| | | |
|---|---|---|
| *A01K 1/015* | (2006.01) | |
| *A01K 5/01* | (2006.01) | |
| *A01K 7/00* | (2006.01) | |

(52) U.S. Cl.
CPC .......... *A01K 1/0157* (2013.01); *A01K 5/0135* (2013.01); *A01K 7/005* (2013.01)

(58) Field of Classification Search
CPC .... A01K 1/0157; A01K 5/0135; A01K 7/005; A01K 1/033; A01K 1/035; A01K 1/0353; A01K 1/0035; B65D 21/086; B65D 21/08; B65D 11/18; B65D 11/1846

USPC ............................................ 220/6, 608, 666
See application file for complete search history.

(56) References Cited

U.S. PATENT DOCUMENTS

| | | | | |
|---|---|---|---|---|
| 3,967,773 | A * | 7/1976 | Kaufmann | B65D 5/001 229/125.17 |
| 6,142,366 | A * | 11/2000 | Sagel | B65D 3/04 229/101.2 |
| 6,238,090 | B1 * | 5/2001 | Yuter | B65D 33/30 383/2 |
| 7,654,402 | B2 * | 2/2010 | Kusuma | B65D 21/086 220/666 |
| D826,480 | S * | 8/2018 | Bohline | D30/120 |
| 2004/0200432 | A1 * | 10/2004 | Hale | A01K 1/0157 119/652 |
| 2009/0241844 | A1 * | 10/2009 | Becattini, Jr. | A01K 7/005 119/51.5 |
| 2011/0311688 | A1 * | 12/2011 | Becraft | B65D 77/003 426/111 |
| 2014/0259910 | A1 * | 9/2014 | Dunn | A01G 9/02 47/65.5 |
| 2015/0353232 | A1 * | 12/2015 | Kandel | B65D 21/0204 220/574 |
| 2016/0037744 | A1 * | 2/2016 | Rudin | A01K 5/0107 119/28.5 |
| 2017/0280675 | A1 * | 10/2017 | MacNeil | A01K 5/0135 |
| 2018/0103608 | A1 * | 4/2018 | Bohline | A01K 1/0157 |
| 2019/0085503 | A1 * | 3/2019 | Tsui | A45C 7/0031 |

* cited by examiner

*Primary Examiner* — Katelyn T Truong
(74) *Attorney, Agent, or Firm* — UB Greensfelder LLP

(57) ABSTRACT

A universal liner including one or more bendable or trimmable wall sections configured to permit the universal liner to fit within a variety of different sized pet crates.

22 Claims, 7 Drawing Sheets

PET CRATE INSERT

The present disclosure claims priority on U.S. Provisional Patent Application Ser. No. 62/635,811 filed Feb. 27, 2018, which is incorporated herein by reference.

The present disclosure relates to a device for insverting onto the bottom or base of an enclosure, particularly to a liner, tray, mat, or insert adapted to fit onto the bottom or base of an enclosure, more particularly to a liner, tray, mat, or insert adapted to fit within a crate, kennel, or cage for a pet, and still more particularly to a universal or one-size-fits-all liner adapted to fit within pet crates of many different sizes. The liner may include one or more bendable or trimmable wall sections that, if necessary, can be bent or removed to permit a customized fit of the liner within an associated pet crate. The liner of the present disclosure can be used with any number of pet crate size categories, such as small, medium, and/or large pet crates.

BACKGROUND ON THE DISCLOSURE

Habitats for pets, commonly referred to as crates, kennels, or cages, come in a number of different sizes to accommodate house pets of different sizes. Common pet crates include inserts that are fixed to the bottom of the crate to cover the construction material from which the crate is made. Moreover, pet owners often like to place a covering over the bottom of their pet's crate to provide comfort to the pet. Common items used to cover the bottom of the crate often include household items such as towels, blankets, rugs, paper, cardboard, etc. Preformed fixed inserts that are designed to cover the bottom of a crate can be purchased at a specific size which specifically corresponds to the size of the associated crate. However, these preformed fixed inserts can make the cleaning of pet crates a cumbersome and relatively time-consuming task. Household coverings such a paper, towels, rugs and blankets (when used) typically move easily on the top surface of the crate thereby exposing the bottom of the crate; such household coverings also do not provide a stable floor surface for the pet in the crate. Furthermore, specifically sized inserts for a particular create can be difficult to find or result in the purchasing of an insert that does not properly fit within the pet crate.

In view of the current state of prior art pet crates, there remains a need for a liner that is removable from an associated crate, that can be easily bent or trimmed to fit a number of different crate sizes, and that provides grip and stability within the associated crate without sacrificing pet comfort.

BRIEF DESCRIPTION OF DISCLOSURE

The present disclosure is directed to a novel universal liner adapted to fit within pet crates having various sizes. The universal liner, which can also be referred to as a mat, tray, or insert, includes one or more bendable or trimmable wall sections that can be bent or removed to customize the size of the universal liner for use in a particular sized pet crate. In one non-limiting embodiment, the novel universal liner includes one or more walls that includes an adjustment section formed of one or more bendable or trimmable or "cut-to-size" sections. In one non-limiting configuration, a transition region is optionally located between the top of the wall and the adjustment section. When the transition region is used, the transition region is generally a curved or arcuate structure that curves upwardly and outwardly from the top of the wall. The length or width of the transition region is generally less than the length or width of the one or more adjustment sections. In one non-limiting arrangement, the transition region (when used) is integrally formed between the top of the wall and the adjustment section. As can be appreciated, the transition region optionally can be configured to be removable from the wall.

In accordance with another and/or alternative non-limiting aspect of the present disclosure, there is provided a novel universal liner which includes an adjustment section formed of one or more cut-to-size sections wherein each of the cut-to-size sections includes a bending structure such as, but not limited to, one or more grooves, serrations, or other structure that facilitates in the bending of the one or more cut-to-size sections relative to the wall, or the partial or full removal of the one or more cut-to-size sections from 1) the wall, 2) the transition region, or 3) an adjacently positioned cut-to-size section that is still secured to the liner. When the bending structure is in the form of a groove, the thickness of the groove is generally less than a thickness of the portion of the adjustment structure that is absent the groove. In one non-limiting arrangement, the universal liner which includes a plurality of cut-to-size sections, wherein a first cut-to-size section is connected to a wall or transition region and is bendable or removable from the wall or transition region, and a second cut-to-size section that is connected to the first cut-to-size section and is bendable or removable from the first cut-to-size section, and optionally a third cut-to-size section that is connected to the second cut-to-size section and is bendable or removable from the second cut-to-size section, and optionally a fourth cut-to-size section that is connected to the third cut-to-size section and which the fourth cut-to-size section is bendable or removable from the third cut-to-size section. The width of each of the cut-to-size sections can be the same or different. Generally, the width of the cut-to-size sections is about 0.25-3 inches (and all values and ranges therebetween), and typically about 0.5-2 inches. In one non-limiting specific configuration, the universal liner includes a plurality of cut-to-size sections, and wherein each of the cut-to-size section has the same width of about 0.5-1.5 inches.

In accordance with another and/or alternative non-limiting aspect of the present disclosure, there is provided a novel universal liner which includes an adjustment section that extends outwardly from the wall of the liner and which extends 1) normal from the wall or transition region, or 2) upwardly from the wall or transition region. In one non-limiting configuration, the adjustment section extends outwardly from the wall of the liner and extends upwardly from the wall or transition region. Such upward and outward extension of the adjustment section facilitates in the placement and positioning of the liner in the crate. When the adjustment section extends upwardly from the wall, the upward angle is about 10-60° (and all values and ranges therebetween), and typically about 25-50°.

In accordance with another and/or alternative non-limiting aspect of the present disclosure, there is provided a novel universal liner which includes a recess portion which provides easy access to the interior region of the universal liner. When a recess portion is included in the liner, the location of the recess portion is absent any adjustment sections. The location of the recess portion on the liner is non-limiting. In one non-limiting embodiment, the recess portion is located on the front or back portion of the liner. When the recess portion is located on the front or back portion of the liner, the width of the recess portion is about 50-100% (and all values and ranges therebetween) the width of the front or back portion of the liner. In one non-limiting configuration, the recess portion is located on the front portion of the liner and is about 80-100% the width of the front portion. The recess portion generally replaces about 50-100% (and all values and ranges therebetween) of the height of the wall of the liner. In one non-limiting configuration, the recess portion replaces about 70-100% of the height of the wall.

In accordance with another and/or alternative non-limiting aspect of the present disclosure, there is provided a novel universal liner which includes a generally planar surface that includes one or more surface features to provide a texture to the planar surface. In one non-limiting embodiment, the liner includes a bottom surface that includes one or more surface features used to provide a texture to the bottom surface to create a non-skid surface between the universal liner and the floor of the crate that facilitates in maintaining the liner in position on the crate floor. In one non-limiting configuration, the non-skid surface can be formed of ribs, grooves, slots, channels, etc. In one non-limiting configuration, the non-skid surface is formed of a plurality of ribs and/or channels, wherein each rib or channel has a width of about 0.1-1 inch (and all values and ranges therebetween), and which all or a plurality of the ribs or channels are spaced apart about 0.1-3 inches (and all values and ranges therebetween), and wherein the height or depth of each of the ribs or channels is about 0.1-1 inch (and all values and ranges therebetween). In another non-limiting embodiment, there is provided a novel universal liner which includes a top surface that includes one or more surface features used to provide a texture to the top surface to create a non-skid surface to enable a pet to easily move about the top surface of the liner. In one non-limiting configuration, the non-skid surface can be formed of ribs, grooves, slots, channels, etc. In one non-limiting configuration, the non-skid surface is formed of a plurality of ribs and/or channels, wherein each rib or channel has a width of about 0.1-1 inch (and all values and ranges therebetween), and which all or a plurality of the ribs or channels are spaced apart about 0.1-3 inches (and all values and ranges therebetween), and wherein the height or depth of each of the ribs or channels is about 0.1-1 inch (and all values and ranges therebetween). In another non-limiting embodiment, there is provided a novel universal liner which includes a top surface that includes one or more surface features in the form of retaining walls that are used to facilitate in retaining and/or preventing movement of a receptacle (e.g., water bowl, food bowl, etc.) disposed on the top surface of the liner. Generally, the liner includes only 1-4 retaining walls. The one or more retaining walls extend upwardly from the top surface of the liner. If the top surface of the liner includes other surface structures in the form of surface structures forming a non-skid surface, the one or more retaining walls have a height that is greater (e.g., 10-300+ % greater and all values and ranges therebetween) than such other surface structures in the form of surface structures forming a non-skid surface. When the bottom surface of the liner has a generally square or rectangular shape, the one or more retaining walls are generally located near the corners of the bottom surface; however, this is not required. In one non-limiting configuration, the one or more retaining walls are positioned in the top surface of the liner such that both the one or more retaining walls and the inner surface of the side wall is used to retaining the receptacle in a particular region on the top surface of the liner, and the retaining wall has a curved profile or includes a curved profile along a longitudinal length of the retaining wall. Generally, the one or more retaining walls are positioned on the top surface of the liner to retain pet bowls or plates having a diameter of no more than 12 inches. For example, when the retaining wall is formed to retain a maximum of an 8-inch diameter bowl, when the 8-inch diameter bowl is placed on the top surface of the liner wherein the retaining wall is to retain such bowl, the maximum distance of the base of the bowl from the retaining wall is 0.25 inches. Likewise, when the retaining wall is formed to retain a maximum of a 6-inch diameter bowl, when the 6-inch diameter bowl is placed on the top surface of the liner wherein the retaining wall is to retain such bowl, the maximum distance of the base of the bowl from the retaining wall is 0.25 inches.

In accordance with another and/or alternative non-limiting aspect of the present disclosure, there is provided a novel universal liner which has a bottom surface having a generally square or rectangular shape; however, it can be appreciated that the bottom surface of the liner can have other shapes (e.g., circular, oval, polygonal, etc.). In one non-limiting configuration, when the bottom surface has a generally square or rectangular shape, the size of the bottom surface is generally 5-70 inches by 5-70 inches (and all values and ranges therebetween).

In accordance with another and/or alternative non-limiting aspect of the present disclosure, there is provided a novel universal liner which has walls having a height of about 1-6 inches (and all values and ranges therebetween).

In accordance with another and/or alternative non-limiting aspect of the present disclosure, there is provided a novel universal liner which makes the cleaning of a pet crate faster and easier.

In accordance with another and/or alternative non-limiting aspect of the present disclosure, there is provided a novel universal liner which eliminates the need for a pet provider to climb into the crate on his/her hands and knees to clean the crate floor.

In accordance with another and/or alternative non-limiting aspect of the present disclosure, there is provided a novel universal liner which adds cushion to the crate floor and/or dampens sound due to pet movement in the crate.

These and other objects and advantages will become apparent from the discussion of the distinction between the disclosure and the prior art and when considering the non-limiting embodiment illustrated in the accompanying drawings.

BRIEF DESCRIPTION OF THE DRAWINGS

Reference may now be made to the drawings, which illustrate various non-limiting aspects of embodiments that the disclosure may take in physical form and in certain parts and arrangements of parts wherein.

DETAILED DESCRIPTION OF NON-LIMITING EMBODIMENTS

Figure 1:
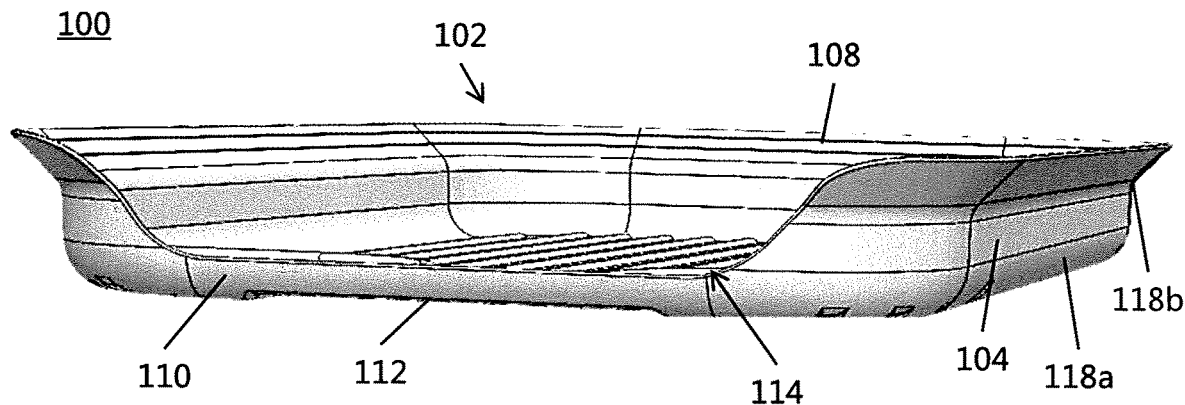
FIG. 1 is an illustration according to one non-limiting embodiment of the present disclosure illustrating a front elevation view of a liner device configured to fit within an associated pet crate.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Referring now to the drawings, wherein the showings are for the purpose of illustrating non-limiting embodiments of the disclosure only and not for the purpose of limiting the same, FIGS. 1-8 illustrate various aspects of a liner for insertion onto the bottom of an enclosure such as a crate 140 for a pet.

Figure 2:
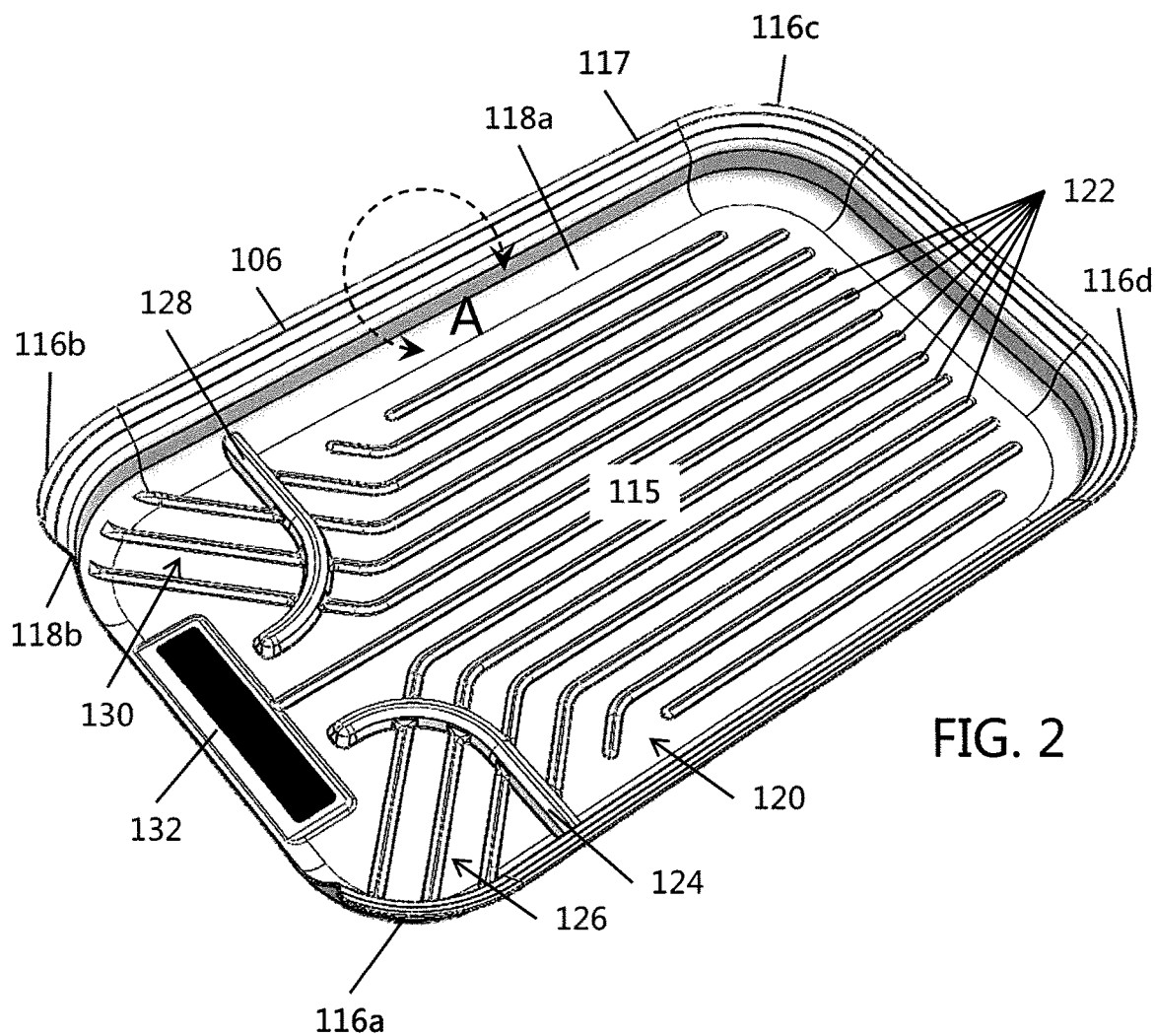
FIG. 2 is a top elevation view of the liner of FIG. 1.
Figure 3:
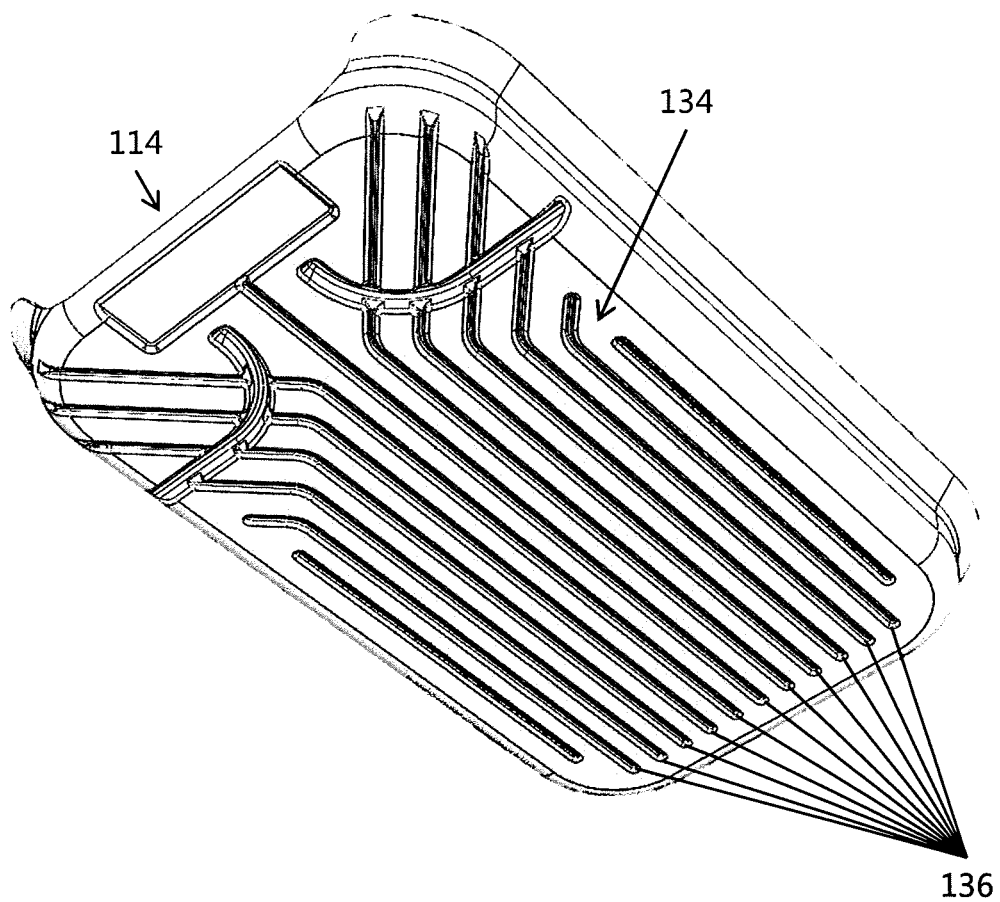
FIG. 3 is a bottom elevation view of the liner of FIG. 1.

Referring now to FIGS. 1-3, there is illustrated a liner 102 for insertion onto the bottom of an enclosure, such as a crate, kennel, or cage 140. The liner 102 is adapted to securely fit within pet crates of many different sizes. In other words, the liner 102 can be described as a "one-size-fits-all" or as a "universal" liner for a particular size range of crate, kennel, or cage 140. The liner 102 may also be referred to as a "mat", "tray", "insert", etc., and these terms can be used interchangeably in the present disclosure without limiting the same.

The liner 102 is generally a wide, planar structure designed for use on generally flat surfaces, such as the bottom surface of a pet crate. However, the specific location of use is non-limiting, and the liner 102 can be used on any number of surfaces (e.g., floor, box, basket, etc.). The liner 102 includes a first sidewall 104 and an opposing second sidewall 106, a rear wall 108, an opposing front wall 110, and a bottom wall or floor portion 112. The floor 112 is generally oriented horizontally with respect to walls 104, 106, 108, and 110, and the walls all extend upwardly about the entire periphery of the floor to form an interior region 115. The length and width of the floor portion 112 is about 10-60 inches by 10-60 inches. As illustrated in FIG. 2, the floor portion 112 has a generally rectangular shape. The average thickness of the material used to form the floor portion 112 and other portion of the liner is generally 0.05-0.5 inches. On one non-limiting configuration, the liner is formed of a single piece of material (e.g., plastic, paper board, pressed board, etc.). The height of the walls 104, 106, 108, and 110 is generally about 1-6 inches.

A portion of the front wall 110 includes a recess portion 114 which provides easy access to the interior region 115. The recess portion 114 extends about 75-90% of the width of the front wall 110. As illustrated in FIG. 1, the height of the recess portion 114 is about 60-90% of the height of the front wall 110. The base of the recess portion 114 is generally parallel to the plane of the floor portion 112. The two side walls of the recess portion 114 are angled; however, this is not required.

The first sidewall 104 and the front wall 110 meet at rounded corner portion 116a and the first side wall and rear wall 108 meet at rounded corner portion 116d. Similarly, the second sidewall 106 and front wall 110 meet at rounded corner portion 116b and the second sidewall and rear wall 108 meet at rounded corner portion 116c. The walls 104, 106, 108, and 110 terminate at a top transition region 118b of the liner 102. As can be appreciated, the corners of the liner are not required to be rounded.

A bottom transition region 118a is formed between the floor 112 and walls 104, 106, 108, 110 to transition between the horizontal orientation of the floor to the general vertical orientation of the walls 104, 106, 108, and 110. The top transition region 118b is located between the top of walls 104, 106, 108, and 110 and the adjustment section 138. The top and/or bottom transition sections can be rounded; however; this is not required. The width of the top and/or bottom transitions sections is generally less than the height of the walls. The width of the top and/or bottom transitions sections is also generally less than the width of the adjustment section 138. As illustrated in FIG. 1, the top transition region 118b orients the adjustment section 138 to be positioned outwardly from walls 104, 106, 108, and 110 and angled upwardly from floor 112. The upward angle a is generally 25-50°. The outwardly extending adjustment section 138 has the effect of widening the top footprint of the liner.

The floor 112 includes a first generally planar surface 120 facing the interior region 115 of the liner 102. The first planar surface 120 makes up the bottom of the interior region 115. The first planar surface 120 includes one or more surface features 122 generally disposed over the one or more portions of the first planar surface. The one or more surface features 122 provide a texture to the first planar surface 120. As illustrated in FIG. 2, for example, the surface features 122 can include a plurality of recessed channel elements extending parallel to one another and between the rear and front walls 108, 110. The cross-sectional shape, width, and depth of a plurality or all of the recess channel elements are generally the same. In one non-limiting configuration, the width of a plurality or all of the recess channel elements is about 0.2-1.5 inches, and the depth of a plurality or all of the recess channel elements is about 0.1-1.5 inches. Generally, the width of the recess channel elements is less than the width of the paw or foot of the animal that is to be placed on the liner. As illustrated in FIG. 2, a plurality of the recess channel elements extend about 75-100% of the distance between rear and front walls 108, 110. The recessed channels can provide grip for a pet housed within a crate having the liner 102 installed, such as crate 140 illustrated in FIGS. 6-8, and may also prevent pooling of any solids or liquids which may contact the liner. As can be appreciated, the one or more surface features can be raised ribs that extend upwardly from the surface 120. The specific texture provided by the one or more surface features 122 is non-limiting, and any number of different textures may be included in/on the first planar surface 120 without departing from the scope of the present disclosure.

The first planar surface 120 also includes one or more retaining walls, such as first and second retaining walls 124, 128 disposed adjacent curved corner portions 116a and 116b, respectively, and extend upwardly from surface 120. The height of the retaining walls 124, 128 is less that the height of the side walls 104, 106 and 108. The height of the retaining walls 124, 128 can be the same, less, or greater than the height of the portion of wall 110 that includes the recess portion 114. Generally, the height of the retaining walls 124, 128 is about 10-90% (and all values and ranges therebetween) less than the height of side walls 104, 106 and 108. The first and second retaining walls 124, 126 define first and second retaining areas 126, 130, respectively, within the interior region 115 of the liner 102. The shape of the retaining walls 124, 128 is adapted to help retain and/or prevent movement of a receptacle (e.g., bowl, plate, etc.) disposed within respective retaining areas 126, 130, such as the food and water bowls F and W illustrated in FIGS. 6-8. Accordingly, the retaining walls 124, 128 can be shaped to complement an outer surface shape of the receptacle. For example, the retaining walls 124, 128 illustrated in FIG. 2 include an arcuate shaped portion which complements the circular shape of food and water bowls F, W illustrated in FIGS. 6-8; however, other shapes can be used. If the surface 120 includes one or more raised ribs, the height of the retaining wall is generally greater than the raised ribs; however, this is not required. The retaining wall or the retaining wall in combination with one or more walls 104, 106, 108, and 110 is configured to encircle at least 60% (e.g., 60-100% and all values and ranges therebetween) of the retaining area that is configured to contain a bowl or plate that is placed within the retaining area such that the bowl or plate cannot slide out of the retaining area, but instead must be lifted out from the retaining area. As such, the retaining area facilitates in retaining the bowl or plate in a particular location in the liner and inhibits or prevents the pet from moving the plate or bowl out of the retaining area. As illustrated in FIG. 2, one end of the retaining wall 124 is in contact with wall 104 and the other end of the retaining wall 124 is not in contact with any wall. Likewise, one end of the retaining wall 128 is in contact with wall 106 and the other end of the retaining wall 128 is not in contact with any wall. As can be appreciated, both ends or no end of the retaining wall can be in contact with any wall. As also illustrated in FIG. 2, a portion of the retaining walls 124, 128 includes a generally straight portion and a curved portion, wherein the straight portion constitutes about 30-50% of the longitudinal length of the retaining walls 124, 128 and the curved portion constitutes about 50-70% of the longitudinal length of the retaining walls 124, 128. The cross-sectional shape, width, and height of retaining walls 124, 128 are generally the same. In one non-limiting configuration, the width of retaining walls 124, 128 is about 0.2-1.5 inches, and the height of retaining walls 124, 128 is about 0.1-3 inches. Generally the cross-sectional shape, width, and height of retaining walls 124, 128 is greater than the cross-sectional shape, width, and depth/height of a plurality or all of the recess channel elements when such recess channel elements are included on surface 120.

A logo or nameplate 132 can optionally be disposed on the first planar surface 120 in front of the retaining walls 124, 128.

The floor 112 also includes a second planar surface 134, or bottom surface, opposite to the first planar surface 120. The second planar surface 134 optionally includes one or more surface features 136 generally disposed over the entire area of the second planar surface. The one or more surface features 136 can be used to provide a texture to the second planar surface 134. As illustrated in FIG. 3, for example, the surface features 136 can include a plurality of raised ridge or rib elements extending parallel to one another and between the rear and front walls 108, 110. However, the specific texture provided by the one or more surface features 136 is non-limiting, and any number of different textures may be included in/on the second planar surface 134 without departing from the scope of the present disclosure. In any event, the one or more surface features 136 provide a texture adapted to create a non-skid surface between the liner 102 and a crate in which the liner is installed, such as crate 140 illustrated in FIGS. 6-8.

The surface features 136 of the second planar surface 134 and surface features 122 of the first planar service 120 can optionally be complementary to one another for ease of manufacturing. For example, embossing could be performed on the first planar surface 120 to produce surface features 122 made of recessed channel elements. This embossing would also produce complementary raised ridge elements which make up the surface features 136 on the second planar surface 134. However, surface features 122 and 136 are not limited to this complementary configuration. That is, the surface features 122 and 136 can provide the same, similar, or different textures without departing from the scope of the present disclosure.

As discussed briefly above, the liner 102 is adapted to be "one size fits all" or "universal" for a particular range of sizes of pet crates, such that the liner can securely fit within pet crates of various sizes. In this regard, liner 102 includes adjustment section 138. Adjustment section 138 is illustrated in one or more bendable or trimmable or "cut-to-size" sections 138a-138d in which the outer edge of the last cut-to-size sections defines the outer peripheral edge 117 of the liner 102. The cut-to-size sections 138a-138d are generally sized such that upon bending or the cutting and removing the one or more of the cut-to-size sections, the interior region 115 and the overall length and width of the liner 102 decreases, such that the liner is better suited to fit within pet crates that are smaller in size. For example, FIG. 4b illustrates a scenario where cut-to-size sections 138c and 138d have been cut and removed from the liner 102 such that only sections 138a and 138b remain. The removal of cut-to-size sections 138c and 138d from liner 102 results in the maximum outer perimeter of the liner 102 being reduced.

Figure 4A:
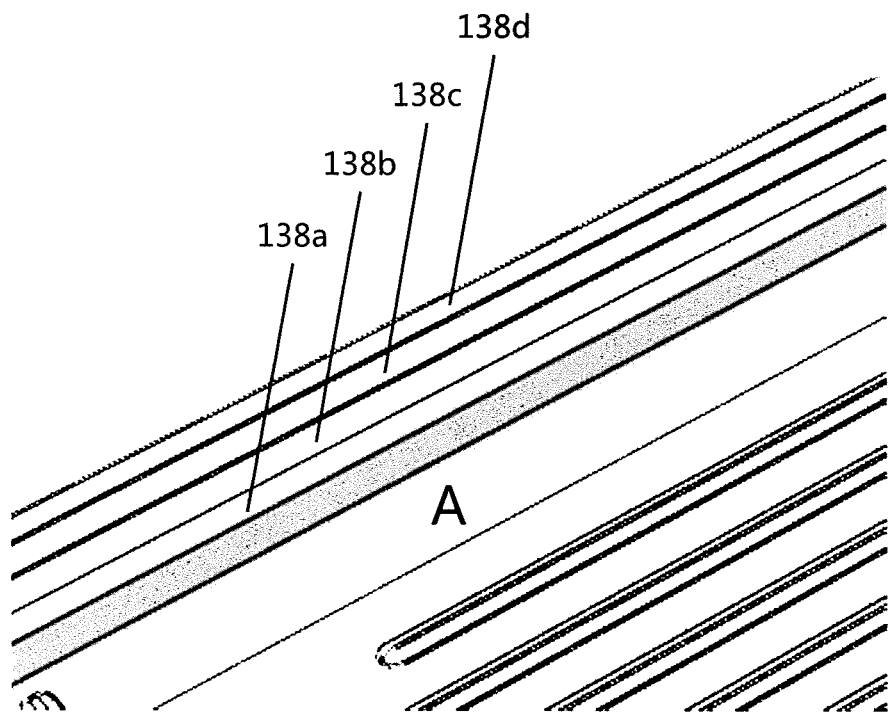
FIG. 4*a* is a close-up detail view of one or more bendable or trimmable or cut-to-size sections indicated at region A in the liner of FIG. 1.
Figure 4B:
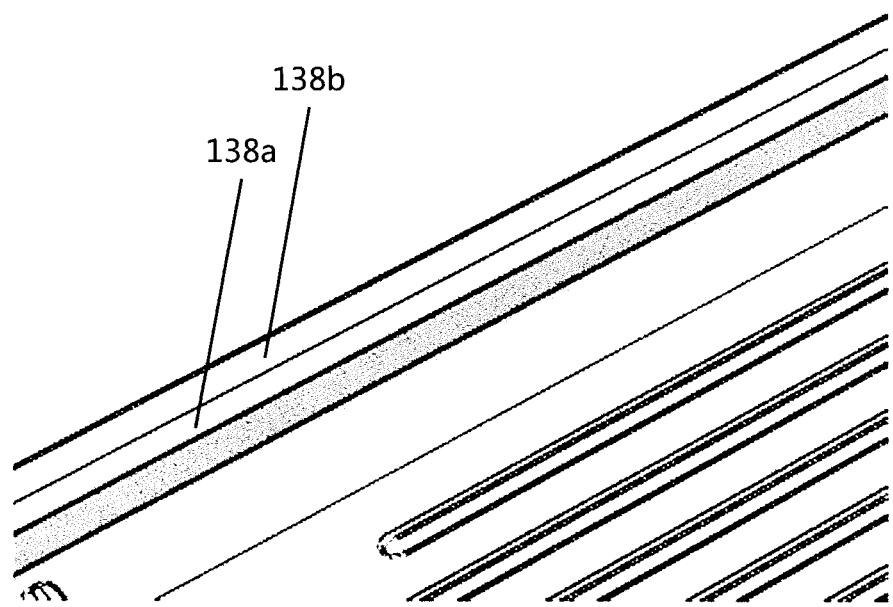
FIG. 4*b* is close-up detail view of FIG. 4*a* having one or more bendable or trimmable or cut-to-size sections removed.

FIG. 4a illustrates four (4) cut-to-size sections 138a, 138b, 138c, and 138d; however, the specific number of bendable or trimmable sections is non-limiting and any number of bendable or cut-to-size sections can be included on the walls 104, 106, 108, 110 without departing from the scope of the present disclosure. The cut-to-size sections include a groove, slots, or serrations between each of the cut-to-size sections and the cut-to-size section that is adjacent to top transition region 118b to facilitate in the bendability and/or removal of one or more cut-to-size sections from the liner 102. As can be appreciated, top transition region 118b can also be configured to be removed from the walls 104, 106, 108, 110. If the top transition region 118b is configured to be removed from the walls 104, 106, 108, 110, a groove, slots or serrations can be located between the top transition region 118b and the walls 104, 106, 108, 110 to facilitate in the removal of the top transition region 118b from the walls 104, 106, 108, 110. Generally, the cut-to-size sections are formed on the liner 102 such that a user can simply tear off one or more cut-to-size sections without the use of scissors or a knife. A plurality of all of the cut-to-size sections has the same shape, size, and cross-sectional shape. Generally, the width of the cut-to-size sections is about 0.4-2 inches.

Figure 5A:
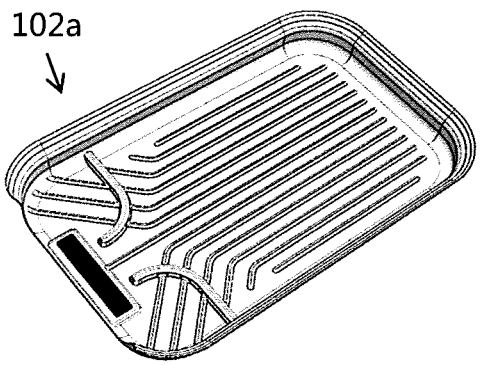
FIG. 5*a* is a top elevation view of the liner of FIG. 1 having a small size.
Figure 5B:
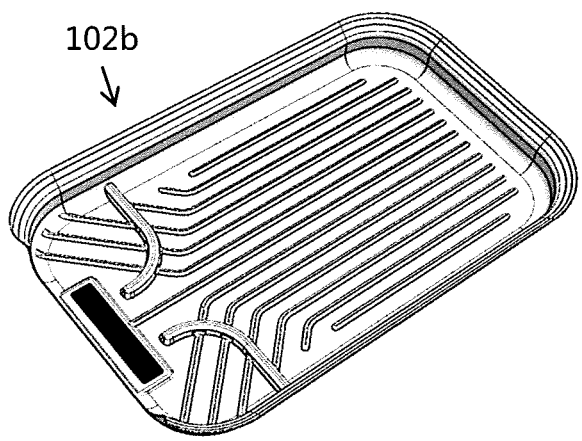
FIG. 5*b* is a top elevation view of the liner of FIG. 1 having a medium size.
Figure 5C:
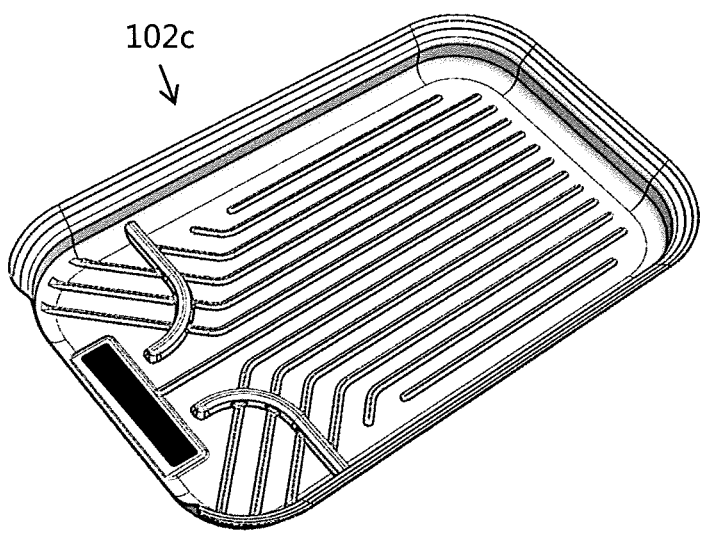
FIG. 5c is a top elevation view of the liner of FIG. 1 having a large size.

Referring now to FIGS. 5a-5c, multiple liners 102a-102c having different sizes are illustrated, each being able to fit within a different size category of an associated crate, such as small, medium, large, etc. In particular, liner 102a is smaller in size compared to liners 102b and 102c in order to fit within an associated crate adapted to house a small pet. Liner 102b is larger than liner 102a but smaller than liner 102c in order to fit within an associated crate adapted to house a medium pet. Liner 102c is larger than both liner 102a and liner 102b in order to fit within an associated crate adapted to house a large pet.

The liners 102a-102c can all initially include a similar number of bendable or trimmable sections, such that each liner is initially provided to an end user at a size that corresponds to the maximum typical size of a crate in a particular size category. For example, liner 102a can initially be provided with a number of bendable or trimmable sections that the liner corresponds to the typical "largest" size of pet crates categorized as "small". The end user can then customize the size of the liner, if necessary, to better fit within the end user's crate by removing a desired number of bendable or trimmable sections from the walls of the liner. Excess waste can advantageously be prevented by providing many different liner sizes, each initially including a similar number of the bendable or trimmable sections, since the overall length and width of each differently sized liner corresponds to a common crate size category (e.g., small, medium large).

Figure 6:
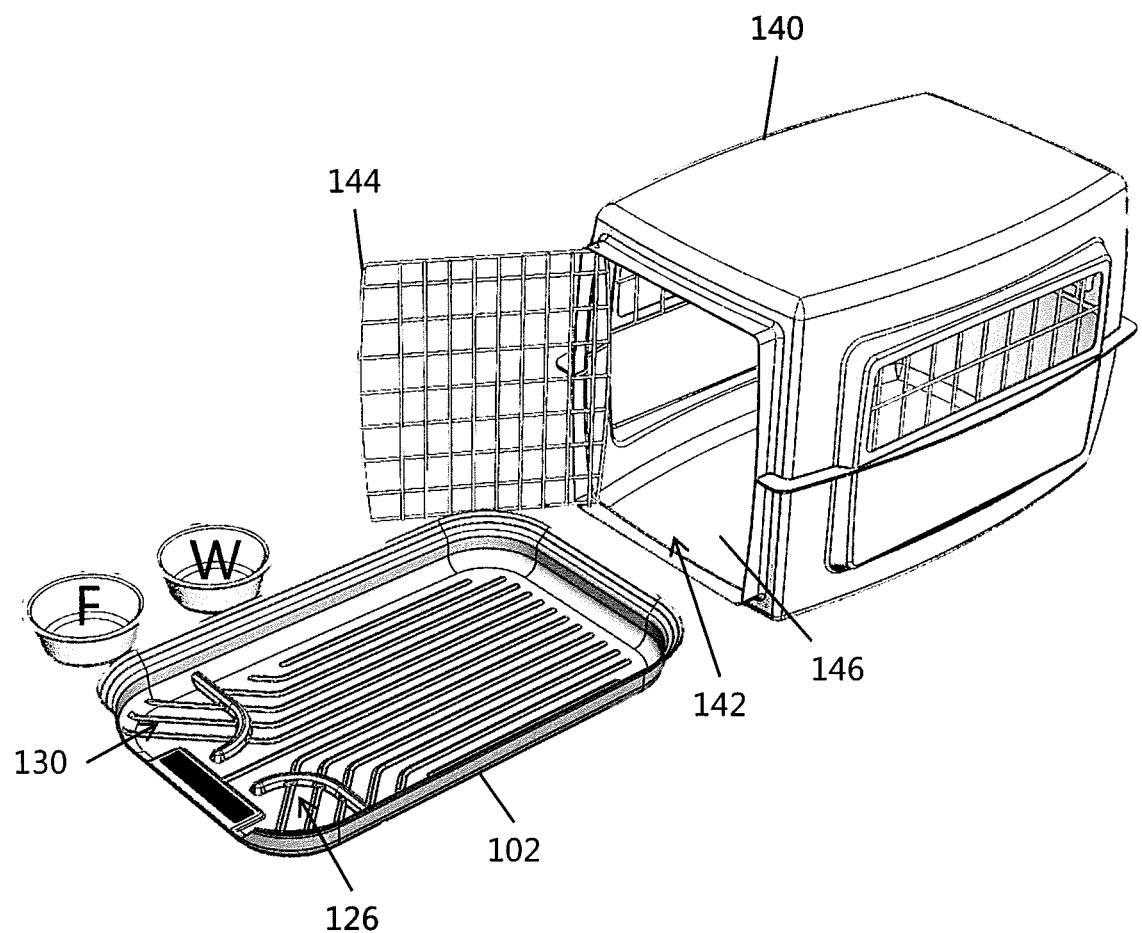
FIG. 6 is a top elevation view of an assembly including the liner of FIG. 1 and an associated pet crate in a pre-assembly configuration.
Figure 7:
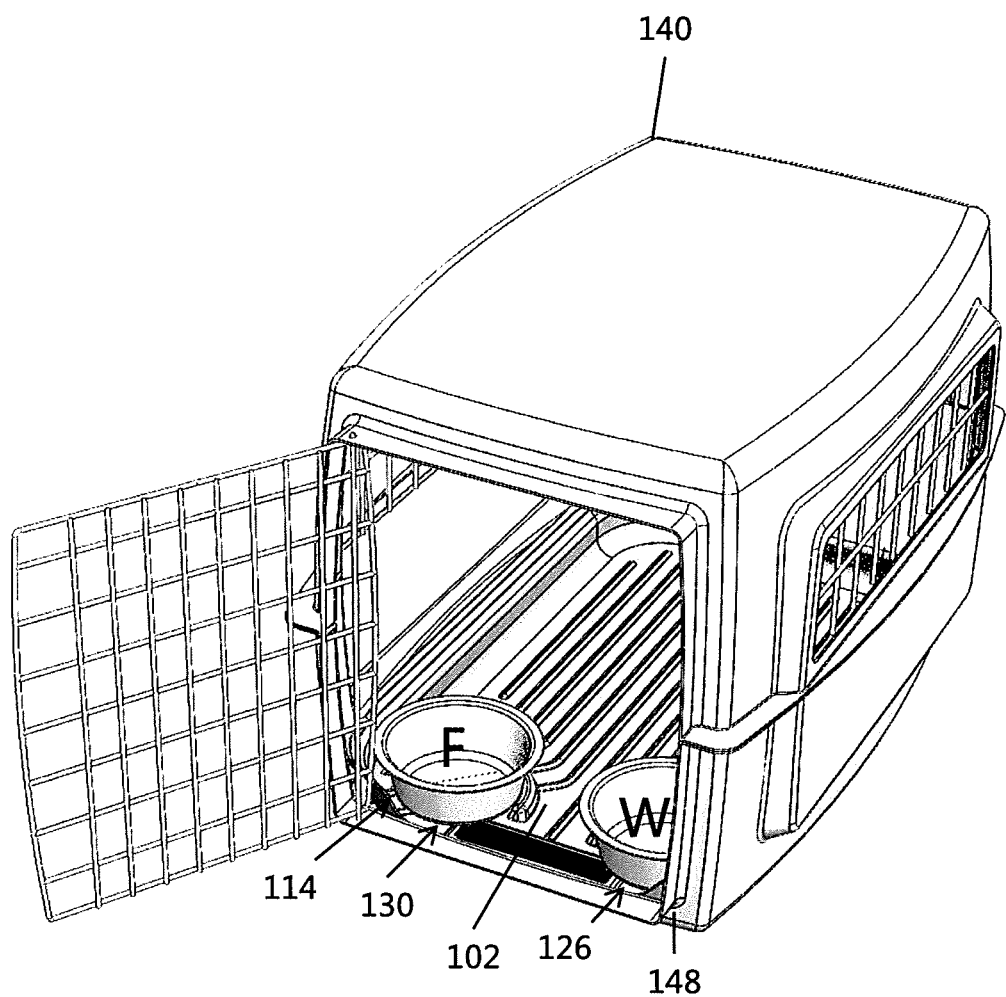
FIG. 7 is a top elevation view of the assembly of FIG. 6 with the liner and pet crate in an open-assembled configuration; and, FIG. 8 is a top elevation view of the assembly of FIG. 6 with the liner and pet crate in a closed-assembled configuration.
Figure 8:
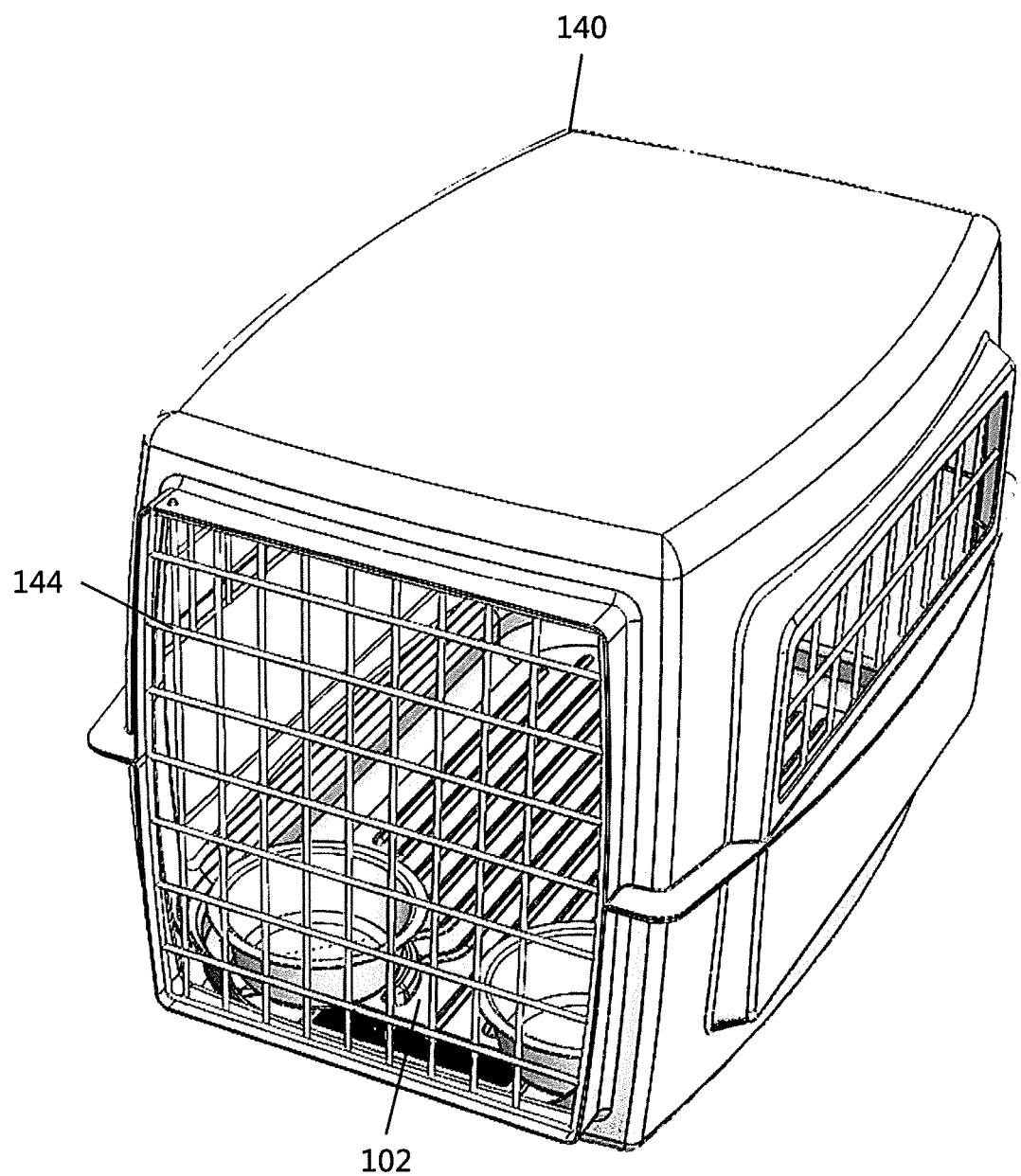

Referring now to FIGS. 6-8, various aspects of an assembly are illustrated, the assembly including a liner 102 as described above and a pet crate 140 in which the liner is adapted to fit. FIG. 6 illustrates a pre-assembly configuration of the liner 102 and the pet crate 140. At the pre-assembly configuration, an end user determines whether it is necessary to remove one or more bendable or trimmable sections from the walls of the liner 102. This decision may be based on whether the liner 102 can pass through the entry area 142 of the crate 140, considering the gate door 144 which may intrude into the entry area and reduce its opening size. It may also be necessary to bend or remove one or more trimmable sections from the walls of the liner 102 to ensure that the liner sits flatly on the floor 146 of the crate 140. The pre-assembly configuration of FIG. 6 also illustrates retaining areas 126 and 130 which are sized to receive and retain associated food and water bowls F, W.

FIG. 7 illustrates an open assembled configuration of the liner 102 and the crate 140, where the liner has had any necessary cut-to-size sections bent or removed to allow the liner to be inserted into the crate and to sit flatly on the crate floor. When one or more cut-to-size sections are removed from the liner 102, the maximum size of the outer perimeter of the liner 102 (as defined by the outer edge of the remaining cut-to-size sections on the liner, or the top transition region 118b if all cut-to-size sections have been removed, or the top edge of the wall if all cut-to-size sections have been removed and the top transition region 118b has been removed) is reduced.

The opening 114 in the front wall of the liner 102 is also indicated in FIG. 7 to show that the opening can generally be sized to correspond to the height of an entry step 148 of the crate 140, such that there is no lip or overhanging portion of the liner which might impede entrance into the crate. FIG. 7 also illustrates the water and food bowls W, F sitting within respective retaining areas 130, 126. During insertion of the liner 102 into the crate 140 (i.e., during transition from the pre-assembly configuration illustrated in FIG. 6 to the open assembled configuration illustrated in FIG. 7), the rounded corner portions 116a-116d and first curved transition region 118a help prevent the liner from snagging or getting stuck against portions of the crate, which otherwise might occur with sharp corners and transition regions.

FIG. 8 illustrates a closed assembled configuration of the liner 102 and the crate 140, where the gate door 144 has been shut and the liner fits within the floor area of the crate without any excessive interference and/or gaps between liner and the crate walls due an oversized and/or undersized liner. Moreover, the surface features 136 discussed above with respect to FIG. 3 provide a non-skid interface between bottom of the liner 102 and the floor of the crate 140, thereby helping to prevent the liner from moving around when a pet is housed within the crate.

Accidents, spills, and general wear and tear are common occurrences in pet crates, making cleaning of any mat, tray, insert, or liner inside the crate a common task. When cleaning becomes necessary, the liner 102 can easily and quickly be removed from the crate 140, thereby eliminating the need for an end user to climb into the crate on hands and knees so that all areas of the crate can be reached. During removal of the liner 102 from the crate 140 (i.e., during transition from the open or closed assembled configurations illustrated in FIGS. 7 and 8 to the pre-assembly configuration illustrated in FIG. 6), the rounded corner portions 116a-116d and first curved transition region 118a again help to prevent the liner from snagging or getting stuck against portions of the crate. Moreover, the surface features 122 discussed with respect to FIG. 2 above, in addition to providing grip for any pet housed within the crate, also help to locally contain any accidents or spills while the liner 102 is being removed.

The particular material and manufacturing method for the exemplary pet crate liner 102 disclosed herein is non-limiting, and may include any number of materials or manufacturing methods without departing from the scope of the present disclosure. However, it is generally preferred that the liner material properties provide cushioning to ensure the comfort of any pet housed in an associated pet crate. It is also desirable that the liner material properties provide sound dampening, which increases the comfort for both pet and pet owner. Other desirable material properties for the liner may include impermeability to water, chemicals, and/or pathogens, scratch and tear resistance, odor resistance and/or repellant, and resistance to UV light. One exemplary, non-limiting manufacturing method and material for the liner includes injection molding of a thermoplastic material. The liner can be formed of a reusable and cleanable material such as a plastic or other type of polymer material. Alternatively, the liner can be formed of a disposable material such as paper board, cardboard and the like for a single use or for a few (1-3) uses. Generally, the liner is formed of a single piece of material which facilitates in the ease of insertion and removal from the crate. The thickness of the material used to form the liner is generally about 0.05-0.25 inches. Generally, the floor 112 of the liner 102 is absent openings that would allow liquid to flow from the top surface of the floor on to the interior surfaces of the crate while the liner is positioned in the crate. The liner, when formed of a plastic or polymer material, can be formed by a molding or extrusion process. The liner, when formed by paper board or cardboard, can be formed by a stamping or press molding process.

Moreover, while the liner in FIGS. 1-8 is illustrated as having a general rectangular shape, the particular shape and corresponding dimensions are non-limiting. The liner disclosed herein can include many different shapes and dimensions to fit various types and sizes of pet crates, without departing from the scope of the present disclosure.

To aid the Patent Office and any readers of this application and any resulting patent in interpreting the claims appended hereto, Applicant does not intend any of the appended claims or claim elements to invoke 35 U.S.C. 112(f) unless the words "means for" or "step for" are explicitly used in the particular claim.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed:

1. A method for inserting a liner into a pet crate comprising:
   providing a pet crate; said pet crate including a crate base having a top surface and crate side walls extending upwardly from said crate base;
   providing a liner; said liner including a floor portion, a liner side wall extending upwardly from said floor portion, and a removable and bendable adjustment section that is connected to or interconnected to a top of said liner side wall; said removable and bendable adjustment section extending outwardly from said liner side wall along a height of said removable and bendable adjustment section; said removable and bendable adjustment section positioned about only a portion of a perimeter of said liner; said removable and bendable adjustment section includes a) a plurality of cut-to-size sections, and b) a bending structure positioned between each adjacently positioned cut-to-size section; at least two of said cut-to-size sections having a same width, thickness and cross-sectional shape; said bending structure configured to facilitate in removability and bendability of one or more of said said cut-to-size sections; said bending structure including one or more separation structures selected from the group consisting of a groove, a slot and a serration;
   inserting said liner into said pet crate such that a bottom surface of said floor portion of said liner contacts said top surface of said crate base; and,
   removing a portion of said removable and bendable adjustment section from said liner at said separation structure to remove a portion of said removable and bendable adjustment section so as to reduce a maximum size of an outer perimeter of said liner such that said bottom surface of said floor portion of said liner remains in contact with said top surface of said crate base; and
   wherein said liner side wall remains connected to said floor portion after said portion of said removable and bendable adjustment section is removed from said liner.

2. The method as defined in claim 1, wherein two or more of said plurality of cut-to-size sections each have a width that is less than a height of said liner side wall.

3. The method as defined in claim 1, wherein said removable and bendable adjustment section angles upwardly from said liner side wall.

4. The method as defined in claim 1, wherein a recess portion is positioned in a portion of said liner side wall, said recess portion having a height that is at least 60% a height of said liner side wall, said recess portion absent said removable and bendable adjustment section, said recess portion having a width to enable a pet to move past said recess portion and onto said floor portion of said liner without having to climb over said side wall.

5. The method as defined in claim 1, wherein an upper surface of said floor portion includes a plurality of surface structures to provide a gripping surface to a pet located in said upper surface.

6. The method as defined in claim 1, wherein a bottom surface of said floor portion includes a plurality of surface structures to provide a gripping surface of the liner to said top surface of the pet crate.

7. The method as defined in claim 1, wherein said upper surface of said floor portion includes a retaining wall, a majority of said retaining wall spaced from said liner side wall, said retaining wall extending upwardly from said upper surface of said floor portion, a height of said retaining wall is less than an average height of said liner side wall, said retaining wall at least partially forming a retaining area for a pet bowl or pet plate, said retaining wall encircling at least 60% of said retaining area, and further including the step of placing a pet bowl or plate in said retaining area such that said pet bowl or plate is maintained in said retaining area.

8. The method as defined in claim 1, wherein a recess portion is positioned in a portion of said liner side wall; said recess portion absent said removable and bendable adjustment section; said recess portion sized and configured to enable a pet to move past said recess portion and onto said floor portion of said liner.

9. A method for inserting a liner into a pet crate comprising:
providing a pet crate; said pet crate including a crate base having a top surface and crate side walls extending upwardly from said crate base;
providing a liner; said liner including a floor portion, a front wall, a first side wall, a back side wall, a second side wall and a removable and bendable adjustment section; said front wall, said first side wall, said back side wall and said second side wall extending upwardly from said floor portion; said removable and bendable adjustment section is connected to or interconnected to a top of said first side wall, a top of said back side wall and a top of said second side wall; said removable and bendable adjustment section positioned about only a portion of a perimeter of said liner; said removable and bendable adjustment section extending upwardly and outwardly from said top of first side wall, said top of said back side wall and said top of said second side wall; said removable and bendable adjustment section at least partially absent from a top of said front wall; said removable and bendable adjustment section extending outwardly along a height of said removable and bendable adjustment section; said removable and bendable adjustment section includes first and second cut-to-size sections; said first and second cut-to-size sections having the same width, thickness and cross-sectional shape; a bending structure is positioned between said first and second cut-to-size sections; said first cut-to-size section having a first edge that includes said bending structure that is positioned between said first cut-to-size section and said top of said first side wall, a top of said back side wall and a top of said second side wall; said second cut-to-size section having a first edge that includes said bending structure that is positioned between a second edge of said first cut-to-size section and said second cut-to-size section; said bending structure configured to facilitate in removability and bendability of at least a portion of said removable and bendable adjustment section;
inserting said liner into said pet crate such that a bottom surface of said floor portion of said liner contacts said top surface of said crate base; and,
removing a portion of said removable and bendable adjustment section from said liner to reduce a maximum outer perimeter of said liner such that said bottom surface of said floor portion of said liner remains in contact with said top surface of said crate base; and wherein said front wall, said first side wall, said back side wall, and said second side wall remain connected to said floor portion after said portion of said removable and bendable adjustment section is removed from said liner.

10. The method as defined in claim 9, wherein a width of said first and second cut-to-size sections are each less than a height of each of said first side wall, said back side wall and said second side wall.

11. The method as defined in claim 10, wherein a recess portion is positioned in a portion of said front wall; said recess portion having width that is at least 50% a width of said front wall and less than a full width of said front wall; said recess portion having a height that is less than a height of said front wall; said recess portion absent said removable and bendable adjustment section; said recess portion sized and configured to enable a pet to move past said recess portion and onto said floor portion of said liner without having to climb over said front wall.

12. The method as defined in claim 11, wherein an upper surface of said floor portion includes a plurality of surface structures to provide a gripping surface to a pet located in said upper surface.

13. The method as defined in claim 12, wherein a bottom surface of said floor portion includes a plurality of surface structures to provide a gripping surface of the liner to said top surface of the pet crate.

14. The method as defined in claim 13, wherein said upper surface of said floor portion includes one or more retaining walls; a majority of each of said retaining walls is spaced from an interior surface of said front wall, said back side wall, said first side wall and said second side wall; each of said retaining walls extending upwardly from said upper surface of said floor portion; each of said retaining walls having a height that is 10-90% an average height of front wall, said back side wall, first side wall and said second side wall; each of said retaining walls at least partially forming a retaining area for a pet bowl or pet plate; each of said retaining walls individually or in combination with an inner surface of said front wall, said back side wall, said first side wall and said second side wall encircling at least 60% of said retaining area.

15. The method as defined in claim 9, wherein a recess portion is positioned in a portion of said front wall; said recess portion having width that is at least 50% a width of said front wall and less than a full width of said front wall; said recess portion having a height that is less than a height of said front wall; said recess portion absent said removable and bendable adjustment section; said recess portion sized and configured to enable a pet to move past said recess portion and onto said floor portion of said liner without having to climb over said front wall.

16. The method as defined in claim 9, wherein an upper surface of said floor portion includes a plurality of surface structures to provide a gripping surface to a pet located in said upper surface.

17. The method as defined in claim 9, wherein a bottom surface of said floor portion includes a plurality of surface structures to provide a gripping surface of the liner to said top surface of the pet crate.

18. The method as defined in claim 9, wherein said upper surface of said floor portion includes one or more retaining walls; a majority of each of said retaining walls is spaced from an interior surface of said front wall, said back side wall, said first side wall and said second side wall; each of said retaining walls extending upwardly from said upper surface of said floor portion; each of said retaining walls having a height that is 10-90% an average height of front wall, said back side wall, first side wall and said second side wall; each of said retaining walls at least partially forming a retaining area for a pet bowl or pet plate; each of said retaining walls individually or in combination with an inner surface of said front wall, said back side wall, said first side wall and said second side wall encircling at least 60% of said retaining area.

19. A method for inserting a liner into a pet crate comprising:
providing a pet crate; said pet crate including a crate base having a top surface and crate side walls extending upwardly from said crate base;
providing a liner; said liner including a floor portion, a front wall, a first side wall, a back side wall, a second side wall and a single piece removable adjustment section; said front wall, said first side wall, said back side wall and said second side wall extending upwardly from said floor portion; said removable adjustment section is connected to or interconnected to a top of said first side wall, a top of said back side wall and a top of said second side wall; said removable adjustment section extending upwardly and outwardly from said top of said back side wall, said top of said first side wall, and said top of said second side wall; said removable and bendable adjustment section positioned about only a portion of a perimeter of said liner; said removable adjustment section extending outwardly along a height of said removable adjustment section; said removable and bendable adjustment section at least partially absent from a top of said front wall; said removable adjustment section includes first and second cut-to-size sections; said first and second cut-to-size sections having the same width, thickness and cross-sectional shape; a bending structure is positioned between said first and second cut-to-size sections; said first cut-to-size section having a first edge that includes said bending structure that is positioned between said first cut-to-size section and said top of said first side wall, a top of said back side wall and a top of said second side wall; said second cut-to-size section having a first edge that includes said bending structure that is positioned between a second edge of said first cut-to-size section and said second cut-to-size section; said bending structure configured to facilitate in removability of at least a portion of said removable adjustment section; a width of said first and second cut-to-size sections are each less than a height of each of said first side wall, said back side wall and said second side wall; said bending structure including one or more separation structures selected from the group consisting of a groove, a slot and a serration;
inserting said liner into said pet crate such that a bottom surface of said floor portion of said liner contacts said top surface of said crate base; and,
removing said first and/or said second cut-to-size sections from said liner at said separation structure to remove a portion of said removable and bendable adjustment section so as to reduce a maximum outer perimeter of said liner such that said bottom surface of said floor portion of said liner remains in contact with said top surface of said crate base; and
wherein said front wall, said first side wall, said back side wall, and said second side wall remain connected to said floor portion after said first and/or said second cut-to-size sections are removed from said liner.

20. The method as defined in claim 19, wherein a recess portion is positioned in a portion of said front wall; said recess portion having width that is at least 50% a width of said front wall and less than a full width of said front wall; said recess portion having a height that is less than a height of said front wall; said recess portion absent said removable adjustment section; said recess portion sized and configured to enable a pet to move past said recess portion and onto said floor portion of said liner without having to climb over said front wall.

21. The method as defined in claim 20, wherein said upper surface of said floor portion includes one or more retaining walls; a majority of each of said retaining walls is spaced from an interior surface of said front wall, said back side wall, said first side wall and said second side wall; each of said retaining walls extending upwardly from said upper surface of said floor portion; each of said retaining walls having a height that is 10-90% an average height of front wall, said back side wall, first side wall and said second side wall; each of said retaining walls at least partially forming a retaining area for a pet bowl or pet plate; each of said retaining walls individually or in combination with an inner surface of said front wall, said back side wall, said first side wall and said second side wall encircling at least 60% of said retaining area.

22. The method as defined in claim 19, wherein said upper surface of said floor portion includes one or more retaining walls; a majority of each of said retaining walls is spaced from an interior surface of said front wall, said back side wall, said first side wall and said second side wall; each of said retaining walls extending upwardly from said upper surface of said floor portion; each of said retaining walls having a height that is 10-90% an average height of front wall, said back side wall, first side wall and said second side wall; each of said retaining walls at least partially forming a retaining area for a pet bowl or pet plate; each of said retaining walls individually or in combination with an inner surface of said front wall, said back side wall, said first side wall and said second side wall encircling at least 60% of said retaining area.

* * * * *